United States Patent Office 3,078,274
Patented Feb. 19, 1963

3,078,274
PRODUCTION OF 5(4-AMINOBUTYL)-HYDANTOIN AND OF INTERMEDIATES THEREFOR
Arthur O. Rogers, Lewiston, N.Y., assignor to E. I. du Pont de Nemours and Company, Wilmington, Del., a corporation of Delaware
No Drawing. Filed June 4, 1959, Ser. No. 818,092
9 Claims. (Cl. 260—309.5)

This invention relates to 5-halovaleraldehyde semicarbazones, their preparation and use in preparing 5-(4-aminobutyl)-hydantoin which is a valuable lysine intermediate.

It is an object of the invention to provide a method for preparing 5-chloro- and 5-bromovaleraldehyde semicarbazones, which are new compounds. A further object is a method of converting said semicarbazones to 5-(4-aminobutyl)-hydantoin. Still further objects will be apparent from the following description.

The objects of the invention are accomplished by the provision of 5-chloro- or 5-bromovaleraldehyde semicarbazone and by the production of said semicarbazone by the hydrogenation of 5-chlorovaleronitrile or 5-bromovaleronitrile with hydrogen in the presence of a hydrogenation catalyst and semicarbazide. In a further embodiment of the invention, the 5-chloro- or 5-bromovaleraldehyde semicarbazone intermediate is reacted with cyanide ions, ammonium ions and carbonate ions in an inert polar liquid solvent to obtain the valuable lysine intermediate, 5-(4-aminobutyl)-hydantoin.

The reaction for converting 5-chlorovaleronitrile to 5-chlorovaleraldehyde semicarbazone can be represented as follows:

(1)
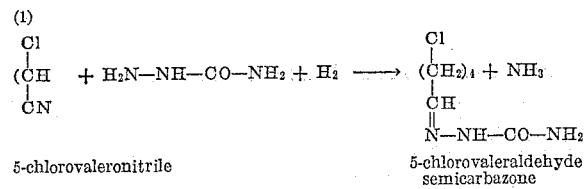

5-bromovaleraldehyde semicarbazone is produced by a similar reaction starting with 5-bromovaleronitrile.

The reaction to convert 5-chlorovaleraldehyde semicarbazone to 5-(4-aminobutyl)-hydantoin can be represented as follows using hydrogen cyanide, ammonia and carbon dioxide as sources of cyanide, ammonium and carbonate ions, respectively:

(2)
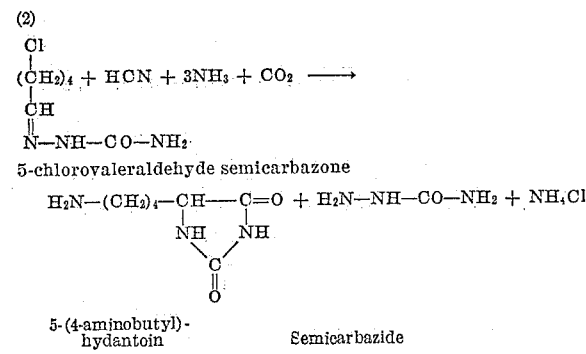

5-bromovaleraldehyde semicarbazone can be converted to 5-(4-aminobutyl)-hydantoin by a similar reaction.

The production of the halovaleraldehyde semicarbazone as illustrated by reaction (1) can be carried out at temperatures ranging from about —30 to 200° C. and hydrogen pressures of about 0.1 to 1000 atmospheres. Temperatures of —10 to 100° C. and hydrogen pressures of 1 to 400 atmospheres are preferred. The preferred hydrogenation catalyst is porous nickel, such as the well-known alloy-skeleton nickel catalyst commonly referred to as Raney nickel. However, any other hydrogenation catalyst which is active at the above temperatures can be used. Examples of these are platinum, palladium and cobalt.

Hydrogenation reaction (1) is preferably carried out employing the halovaleronitrile in the form of a solution or suspension in an inert liquid diluent such as water or a saturated aliphatic alcohol containing 1 to 4 carbon atoms, or a mixture of such diluents. Preferred diluents are methanol, ethanol, and aqueous methanol or ethanol containing up to 60% water by volume. The concentration of the halovaleronitrile in the mixture to be hydrogenated may be varied considerably but generally will range from about 1 to 50%, the preferred concentrations being 5 to 30% by weight of the mixture.

It is essential that semicarbazide be present during the hydrogenation. It may be supplied as the free base, or as a mixture of a salt thereof (e.g., the hydrochloride) with an acid acceptor such as an alkali metal acetate, carbonate or hydroxide. Approximtely 1 mole of semicarbazide will generally be used per mole of the halovaleronitrile. Smaller proportions, e.g., down to 0.5 mole of the semicarbazide per mole of the halovaleronitrile, can be used but are not preferred because of the resulting sacrifice in product yield. Larger proportions, e.g., up to 2 moles or more per mole of the halovaleronitrile can be used but result in no added advantages.

The halovaleraldehyde semicarbazone product of reaction (1) can be recovered conveniently from the reaction mixture by conventional crystallization methods. Thus, the mixture, after separating the catalyst, can be concentrated by vacuum evaporation on the steam bath and then allowed to cool to crystallize out the semicarbazone product.

Specific nitriles have previously been hydrogenated in the presence of semicarbazide to obtain the corresponding aldehyde semicarbazones (see Plieninger and Werst, Angewandte Chemie, 67, 156 (1955)). However, so far as I am aware such a method has not previously been employed to convert any chloro- or bromonitrile to the corresponding aldehyde semicarbazone. This is not surprising since a chlorine or bromine atom, particularly in a terminal position as in the present halovaleronitriles, would have been expected to be removed during the hydrogenation and to result in rapid poisoning of the hydrogenation catalyst. My discovery that the present halovaleronitriles could be successfully converted to the corresponding halovaleraldehyde semicarbazone was entirely unexpected.

The conversion of the halovaleraldehyde semicarbazone to 5-(4-aminobutyl)-hydantoin by reaction with cyanide, ammonium and carbonate ions can be carried out under essentially those conditions which are generally known to be suitable for converting aldehydes or ketones to corresponding hydantoins by reaction with cyanide, ammonium and carbonate ions. The reaction should be carried out in an inert polar solvent, preferably water or a lower alcohol or a mixture of such solvents. Hydrogen cyanide, ammonia and carbon dioxide are convenient sources of the reactant ions, as indicated in reaction (2). Other materials, such as the alkali metal cyanides and carbonates, ammonium hydroxide and ammonium salts such as ammonium carbonate, can obviously be added to the reaction mixture to provide one or more of the reactant ions.

Suitable temperatures for carrying out the reaction to form 5-(4-aminobutyl)-hydantoin range from about 40 to 220° C. Operation under pressure will, of course, be required at the higher temperatures indicated. The preferred temperatures range from 60 to 150° C. The reaction is completed in about 3 to 4 hrs. at 100° C. and in shorter times at higher temperatures. A substantial excess of any of the reactants can be used but an excess of the semicarbazone will generally be avoided for reasons of economy. Generally suitable proportions are 1 to 1.5 moles of cyanide ions, 1 to 10 moles of carbonate ions and 3 to 40 or more moles of ammonium ions per mole of the semicarbazone. A considerable excess of ammonium ions, e.g., at least 10 moles per mole of the semicarbazone, is preferred to favor formation of the desired primary amine group in the product.

As indicated by Equation 2, semicarbazide is liberated as a by-product of the hydantoin-forming reaction. It will generally be desirable for reasons of economy to recover such by-product. This may be effected in conventional ways, e.g., by crystallization or ion-exchange methods. Similar methods may be used to isolate the 5-(4-aminobutyl)-hydantoin product from the reaction mixture. However, isolation at this stage is not essential if the aminobutyl hydantoin is to be used as an intermediate for producing some other product, since the crude aminohydantoin is quite suitable for direct use in further processing, e.g., hydrolysis to lysine.

It has previously been proposed to react certain aldehyde semicarbazones with hydrogen cyanide and ammonium carbonate to obtain hydantoins corresponding to the aldehydes of the semicarbazones used, e.g., 5-(n-propyl)-hydantoin from n-butyraldehyde semicarbazone. In contrast, the present hydantoin-forming reaction yields 5-(4-aminobutyl)-hydantoin instead of 5-(4-halobutyl)-hydantoin which would have been expected to be obtained from the starting halovaleraldehyde semicarbazone. In other words, the present hydantoin-forming reaction involves the simultaneous formation of the hydantoin ring and the substitution of the terminal chlorine or bromine atom by an amino group which is highly desirable.

The invention is illustrated by the following examples.

*Example 1*

A glass-lined rocker reaction bomb was charged with 5-chlorovaleronitrile (35 g., 0.3 mole), semicarbazide hydrochloride (33.5 g., 0.3 mole), sodium acetate trihydrate (54.5 g., 0.4 mole), Raney nickel (settled slurry in water, equivalent to about 25 g. Ni) and aqueous ethanol (290 cc., 60% ethanol by volume). The bomb was purged with hydrogen, then pressured with hydrogen to a pressure of 1520 p.s.i.g. The hydrogen pressure dropped 130 p.s.i. during 46 min. at room temperature, following which the bomb was re-pressured with hydrogen to 1530 p.s.i.g. The pressure dropped an additional 30 p.s.i. over the next 34 min. and thereafter remained constant. The catalyst was filtered off and washed with ethanol, then with water. The filtrate and washings were evaporated on the steam bath under reduced pressure to about 150 cc. The product 5-chlorovaleraldehyde semicarbazone separated from the resulting mixture as a liquid layer which crystallized readily when cooled and rubbed. After standing overnight to complete crystallization, the crystals were filtered off and dried in a vacuum oven. Yield, 24.9 g. (46.7% based on nitrile charged), M.P. 90–91.5° C. After recrystallization from isopropanol, the product melted at 94–96° C. and analyzed: C, 41.03, 41.30%, H, 6.70, 7.00%; N, 23.61%. Calculated for $C_6H_{12}N_3OCl$: C, 40.56%; H, 6.81%; N, 23.65%.

The use of 5-bromovaleronitrile in place of 5-chlorovaleronitrile in the method of Example 1 yields 5-bromovaleraldehyde semicarbazone.

*Example 2*

A charge of 5-chlorovaleraldehyde semicarbazone (6.0 g., 0.034 mole), ammonium carbonate (11.0 g., 0.07 mole), ammonium hydroxide (55 cc., 0.07 mole $NH_3$) and hydrogen cyanide (1.6 cc., 0.04 mole) was heated at 100° C. in a sealed Carius tube for 4 hrs. The resulting solution was evaporated to essentially constant weight on the steam bath under reduced pressure. The residue was shown by paper chromatography to contain 5-(4-aminobutyl)-hydantoin (estimated yeild, 10% based upon the semicarbazone charged). The above residue was transferred with a minimum amount of water to a Carius tube. After adding concentrated hydrochloric acid (25 cc.), the tube was sealed and heated for 16 hrs. at 160° C. The product solution was evaporated to dryness on the steam bath under reduced pressure. The resulting residue was extracted with 50 cc. of 95% ethanol, the undissolved material was filtered off and the filtrate treated with an excess of pyridine. There resulted a gummy precipitate which hardened on standing. This material was shown by paper chromatography and mixed melting point to be mainly DL-lysine monohydrochloride.

The present invention provides a way of making 5-chloro and 5-bromovaleraldehyde semicarbazones and a method for converting these new compounds to 5-(4-aminobutyl)-hydantoin which is a valuable lysine intermediate.

The embodiments of the invention in which an exclusive property or privilege is claimed are defined as follows:

1. The method of producing a halovaleraldehyde semicarbazone comprising hydrogenating a compound of the group consisting of 5-chlorovaleronitrile and 5-bromovaleronitrile in the presence of a hydrogenation catalyst and semicarbazide, said catalyst being selected from the group consisting of porous nickel, platinum, palladium and cobalt.

2. The method of producing a halovaleraldehyde semicarbazone comprising hydrogenating a compound of the group consisting of 5-chlorovaleronitrile and 5-bromovaleronitrile in solution in an inert diluent in the presence of a hydrogenation catalyst and of at least 1 mole of semicarbazide per mole of said compound, said catalyst being selected from the group consisting of porous nickel, platinum, palladium and cobalt.

3. The method of claim 2 employing a porous nickel catalyst.

4. The method of claim 2 employing 5-chlorovaleronitrile.

5. The method of claim 4 employing a porous nickel catalyst.

6. The method of producing 5-(4-aminobutyl)-hydantoin comprising hydrogenating a compound of the group consisting of 5-chlorovaleronitrile and 5-bromovaleronitrile in the presence of a hydrogenation catalyst selected from the group consisting of porous nickel, platinum, palladium and cobalt and of semicarbazide to obtain a 5-halovaleraldehyde semicarbazone and reacting said semicarbazone with cyanide ions, ammonium ions and carbonate ions in an inert polar solvent.

7. The method of producing 5-(4-aminobutyl)-hydantoin comprising hydrogenating 5-chlorovaleronitrile in the presence of a hydrogenation catalyst selected from the group consisting of porous nickel, platinum, palladium and cobalt and of semicarbazide and reacting the resulting 5-chlorovaleraldehyde semicarbazone with cyanide ions, ammonium ions and carbonate ions in an inert polar solvent.

8. The method of claim 6 employing a porous nickel catalyst.

9. The method of claim 7 employing a porous nickel catalyst.

References Cited in the file of this patent

UNITED STATES PATENTS

| | | |
|---|---|---|
| 2,564,649 | Rogers | Aug. 14, 1951 |
| 2,889,332 | Coker et al. | June 2, 1959 |
| 2,889,333 | Coker et al. | June 2, 1959 |
| 2,937,184 | Coker et al. | May 17, 1960 |

FOREIGN PATENTS

| | | |
|---|---|---|
| 700,825 | Great Britain | Dec. 9, 1953 |

OTHER REFERENCES

Kling: Chem. Abstracts, volume 3, page 1280 (1909).
Hibbert et al.: Chem. Abstracts, volume 17, page 1434 (1923).